(12) United States Patent
Tombling et al.

(10) Patent No.: US 6,327,013 B1
(45) Date of Patent: Dec. 4, 2001

(54) LIQUID CRYSTAL DEVICE IN WHICH AN ELECTRIC FIELD WITHIN THE PICTURE ELEMENT VARIES IN INTENSITY

(75) Inventors: Craig Tombling, Stadhampton (GB); Michael Geraint Robinson, Boulder, CO (US); Nicholas Mayhew, Oxford (GB); Duncan James Anderson, Abingdon (GB); Jason Slack, Cowley (GB); Karen Emma Todd, Colyton (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/320,799

(22) Filed: May 27, 1999

(30) Foreign Application Priority Data

May 29, 1998 (GB) .................................... 9811477

(51) Int. Cl.[7] .................................................. G02F 1/1343
(52) U.S. Cl. ........................................ 349/139; 349/147
(58) Field of Search ................................. 349/139, 147, 349/141, 143, 38, 39

(56) References Cited

U.S. PATENT DOCUMENTS

| | | | |
|---|---|---|---|
| 4,759,610 | * 7/1988 | Yanagisawa | 350/334 |
| 4,904,059 | * 2/1990 | Torigoe | 350/339 |
| 5,126,865 | * 6/1992 | Sarma | 359/59 |
| 5,321,535 | * 6/1994 | Ukai et al. | 359/55 |
| 5,608,556 | * 3/1997 | Koma | 349/143 |
| 5,610,739 | * 3/1997 | Uno et al. | 349/39 |
| 5,737,050 | * 4/1998 | Takahara et al. | 349/122 |
| 5,926,244 | * 7/1999 | Takeda et al. | 349/139 |
| 5,946,060 | * 8/1999 | Nishiki et al. | 349/48 |
| 5,953,092 | * 9/1999 | Sung et al. | 349/143 |
| 5,995,182 | * 11/1999 | Watanabe et al. | 349/110 |

FOREIGN PATENT DOCUMENTS

| | | |
|---|---|---|
| 0 749 029 A1 | 12/1996 | (EP) . |
| 0749029 A1 | * 12/1996 | (EP) . |
| 0823654 A2 | * 2/1998 | (EP) . |
| 0 823 654 A2 | 2/1998 | (EP) . |
| 2173029 | * 10/1986 | (GB) . |
| 2 173 029 A | 10/1986 | (GB) . |
| WO 89/12033 | * 12/1989 | (WO) . |

OTHER PUBLICATIONS

Search Report dated Sep. 28, 1998.
Search Report dated May 5, 1999.

* cited by examiner

*Primary Examiner*—William L. Sikes
*Assistant Examiner*—Mike Qi
(74) *Attorney, Agent, or Firm*—Renner, Otto, Boisselle & Sklar

(57) ABSTRACT

A Liquid crystal device includes: first and second substrates; a layer of liquid crystal disposed between the first and second substrates: and a plurality of picture elements. Each of the picture elements includes: a first electrode disposed on the first substrate; a second electrode electrically insulated from and disposed above the first electrode relative to the substrates; and a third electrode disposed on the second substrate.

66 Claims, 10 Drawing Sheets

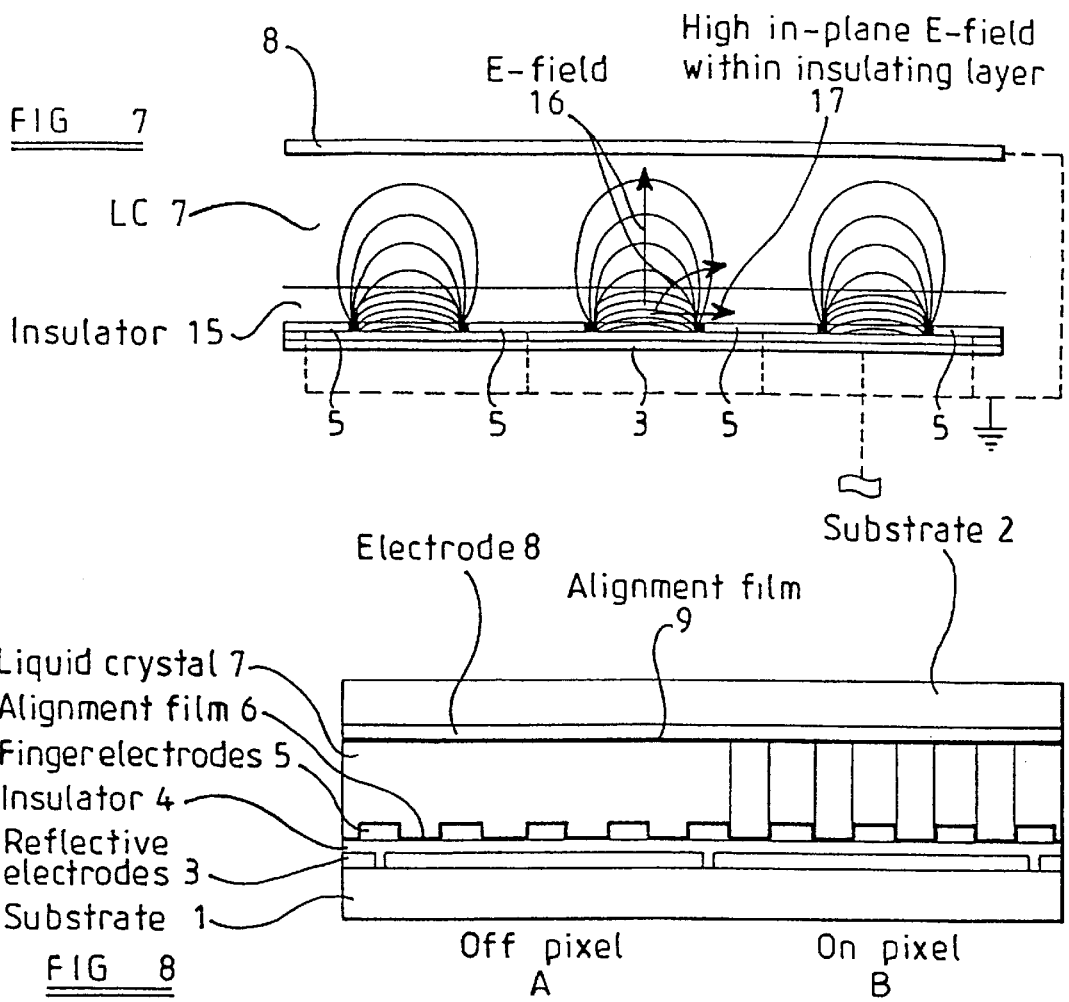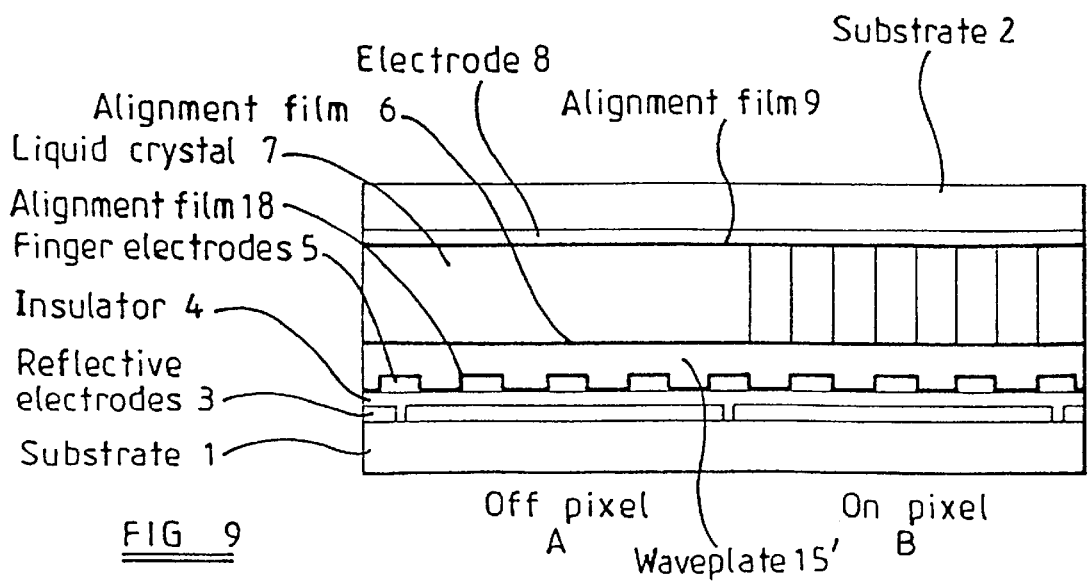

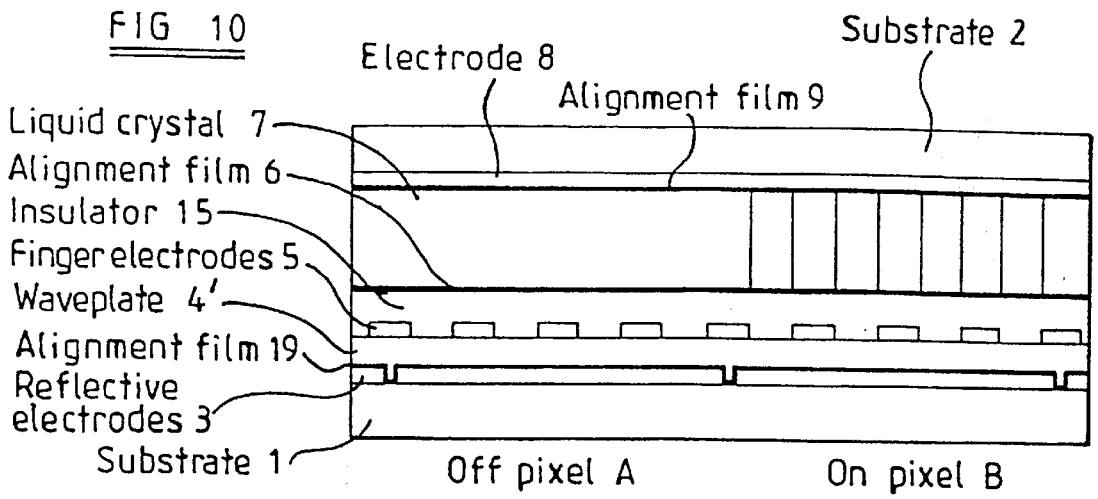
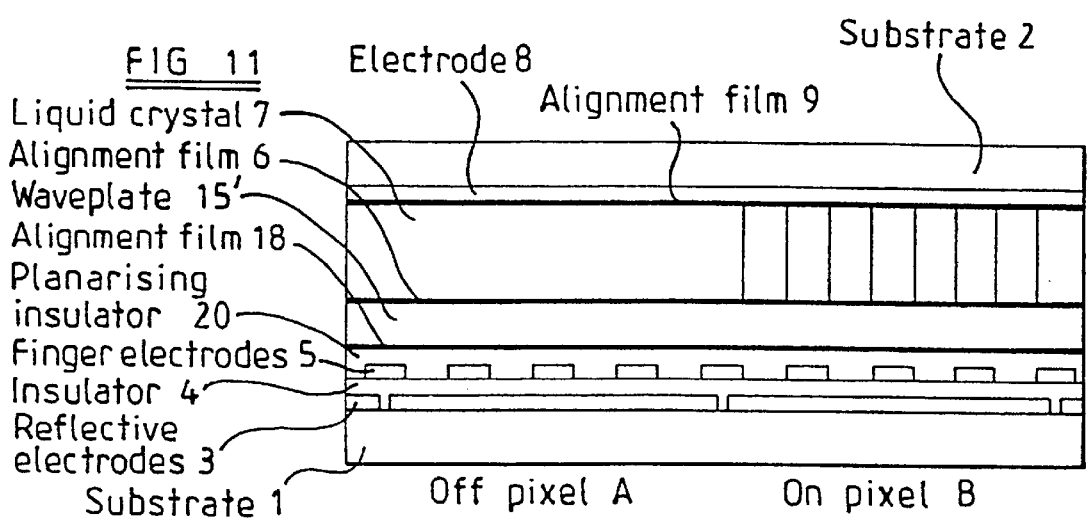
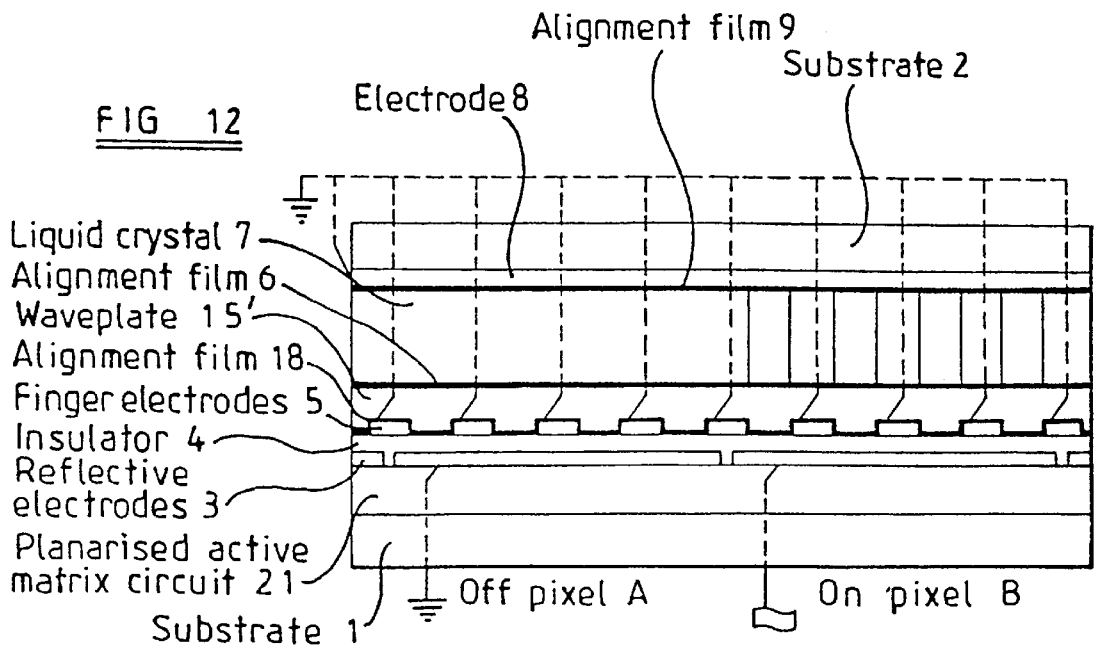

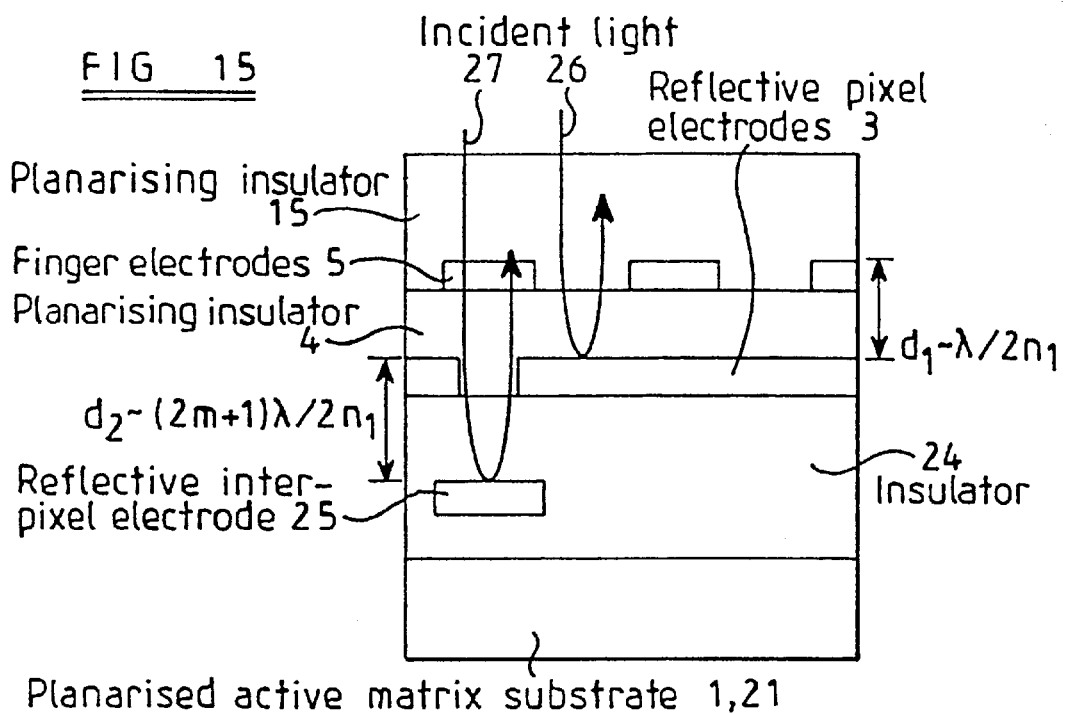
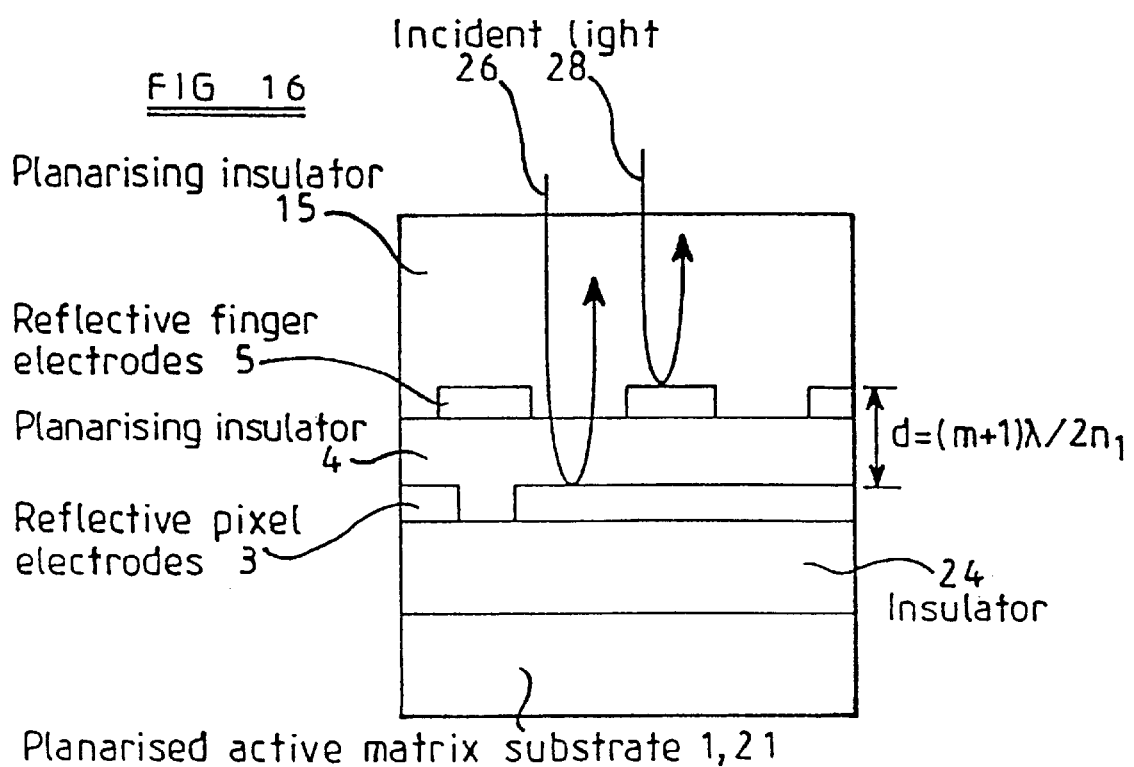

5  5  5  5

LIQUID CRYSTAL DEVICE IN WHICH AN ELECTRIC FIELD WITHIN THE PICTURE ELEMENT VARIES IN INTENSITY

TECHNICAL FIELD OF THE INVENTION

The present invention relates to a liquid crystal device. Such a device may be used, for example, in liquid crystal displays based on diffraction using nematic liquid crystal (NLC), ferroelectric liquid crystal (FLC) and antiferroelectric liquid crystal (AFLC).

DISCUSSION OF THE RELATED ART

Liquid crystal devices having multi-layer electrode structures on one substrate are known. For example, U.S. Pat. Nos. 5,126,865, 5,321,535, 5,576,863 and 5,610,739 disclose liquid crystal displays in which each picture element (pixel) is divided into subpixels in order to provide grey scale capability. The addressing arrangements in these known devices use multilayer electrode arrangements to control addressing of the subpixels so as to achieve grey levels, U.S. Pat. No. 5,608,556 discloses a liquid crystal display intended to provide a wider viewing angle. A multilayer electrode arrangement on one substrate provides a radial electric field component to the normally perpendicular electric field so as to cause the switched orientation of the liquid crystal molecules to vary across the pixel.

EP 0 749 029 discloses a liquid crystal display in which the electric field is generally parallel to the substrates. The electric field is generated between a common electrode and a pixel electrode, both of which are disposed on the lower substrate of the device.

Diffraction based devices using phase-only grating techniques are disclosed in GB 2 313 920 and EP 0 811 872. Addressing arrangements for such devices are disclosed in British patent applications numbers 9702076.2, 9709467.6, 9712134.7 and 9716112.9. Such devices require the use of high resolution electrodes and are suitable for use in projection displays providing high brightness and good contrast ratio.

U.S. Pat. No. 5,182,665 discloses a liquid crystal device which comprises an electrode layer consisting of a pair of inter-digitated electrodes. It is possible to define a diffraction grating in the liquid crystal layer by applying voltages of opposite sign to the two inter-digitated electrodes. In another embodiment of U.S. Pat. No. 5,182,665, the electrode layer consists of an upper electrode layer having a comb-shape disposed over a continuous lower electrode layer, and it is possible to define a diffraction grating in the liquid crystal layer by applying voltages of opposite sign to the two electrode layers.

WO 89/12033 is directed to increasing the physical strength of a conductive film, without adversely affecting the conductivity or optical properties of the film. It discloses a transparent conductive coating containing a transparent insulating layer and a transparent conductive layer, with the two layers having substantially the same refractive index. The transparent conductive coating can be set to have any desired thickness and any desired electrical conductivity. The optical properties of the coating will be determined by the combined thickness of the two layers, provided that the refractive indices of the two layers are equal.

EP-A-0 823 654 discloses a reflective liquid crystal device in which the scanning electrodes on the lower substrate are metallic and are provided with a reflective and diffusive upper surface.

U.S. Pat. No. 5,737,050 is directed to reducing scattering of light substrates of a liquid crystal display device, in order to prevent cross-talk between adjacent pixels. It discloses an "anti-reflection counter electrode", which consists of a dielectric film disposed on an ITO layer. The ITO layer acts as the electrode, and the dielectric film reduces the reflection that occurs at the interface between the substrate and the electrode. It also discloses an anti-reflection counter electrode which consists of a dielectric film, an ITO layer, and a second dielectric film. Each of the dielectric films consists of three dielectric layers having, respectively, a low refractive index, a high refractive index, and a low refractive index.

SUMMARY OF THE INVENTION

According to a fist aspect of the invention, there is provided a liquid crystal device comprising first and second substrates, a layer of liquid crystal disposed between the first and second substrates, and a plurality of picture elements, each of which comprises a first electrode disposed on the first substrate, a plurality of laterally spaced second electrodes electrically insulated from and disposed above the first electrode relative to the substrate, and a third electrode disposed on the second substrate; wherein at least one of the second electrodes is electrically connected to the third electrode.

The second electrodes may be electrically connected together

According to a second aspect of the invention, there is provided a liquid crystal device comprising first and second substrates, a layer of liquid crystal disposed between the first and second substrates, and a plurality of picture elements, each of which comprises a first electrode disposed on the first substrate, a plurality of laterally spaced second electrodes electrically insulated from and disposed above the first electrode relative to the substrate, and a third electrode disposed on the second substrate; wherein the second electrodes in at least one picture element are electrically connected to earth potential.

According to a third aspect of the present invention there is provided a liquid crystal device comprising first and second substrates, a layer of liquid crystal disposed between the first and second substrates, and a plurality of picture elements, each of which comprises a first electrode disposed on the first substrate, a plurality of laterally spaced second electrodes electrically insulated from and disposed above the first electrode relative to the substrate, and a third electrode disposed on the second substrate; wherein the picture elements are arranged in a regular array; and wherein the device further comprises addressing means for address the second electrodes corresponding to a row, or column, of picture elements independently from the second electrodes corresponding to other rows, or columns, of picture elements.

The second electrodes may comprise striped substantially parallel electrodes. The second electrodes may be substantially evenly spaced apart.

The picture elements may be arranged as a regular array.

Each third electrode may extend along and be common to a column of picture elements and each first electrode may extend along and be common to a row of picture elements to form a passive matrix addressing arrangement. The second electrodes may extend substantially parallel to the first or third electrodes. Alternatively, the second electrodes may extend at substantially 45° to the first electrodes.

The third electrode may be common to all of the picture elements and each of the first electrodes may comprise a picture element electrode connected to an active non-linear device to form an active matrix addressing arrangement.

The pixels may be arranged in rows and columns and the second electrodes may extend in substantially the row or column direction. Alternatively, the second electrodes may extend at substantially 45° to the row direction.

A fourth aspect of the present invention provides a liquid crystal device comprising first and second substrates, a layer of liquid crystal disposed between the first and second substrates, and a plurality of picture elements, each of which comprises a first electrode disposed on the first substrate, a second electrode electrically insulated from and disposed above the first electrode relative to the substrate, and a third electrode disposed on the second substrate; wherein the second electrode extends over a central area of the pixel and a plurality of apertures are provided in the second electrode; wherein the second electrode is electrically connected to the third electrode.

A fifth aspect of the present invention provides a liquid crystal device comprising first and second substrates, a layer of liquid crystal disposed between the first and second substrates, and a plurality of picture elements, each of which comprises a first electrode disposed on the first substrate, a second electrode electrically insulated from and disposed above the first electrode relative to the substrate, and a third electrode disposed on the second substrate; wherein the second electrode extends over a central area of the pixel and a plurality of apertures are provided in the second electrode; wherein the second electrode is electrically connected to earth potential.

A sixth aspect of the present invention provides a liquid crystal device comprising first and second substrates, a layer of liquid crystal disposed between the first and second substrates, and a plurality of picture elements, each of which comprises a first electrode disposed on the first substrate, a second electrode electrically insulated from and disposed above the first electrode relative to the substrate, and a third electrode disposed on the second substrate; wherein the second electrode extends over a central area of the pixel and a plurality of apertures are provided in the second electrode; wherein the device further comprises addressing means for addressing the second electrode of a pixel independently from the second electrodes of the other pixels.

The picture elements may be arranged in a regular array.

A seventh aspect of the present invention provides a liquid crystal device comprising first and second substrates, a layer of liquid crystal disposed between the first and second substrates, and a plurality of picture elements, each of which comprises a first electrode disposed on the first substrate, a second electrode electrically insulated from and disposed above the first electrode relative to the substrate, and a third electrode disposed on the second substrate; wherein the second electrode extends over a central area of the pixel and a plurality of apertures are provided in the second electrode; wherein the picture elements are arranged in a regular array; and wherein the device further comprises addressing means for addressing the second electrodes corresponding to a row, or column, of picture elements independently from the other rows, or columns, of picture elements.

The second electrode may extend over substantially the entire area of the pixel.

Each third electrode may extend along and be common to a column of picture elements and each first electrode may extend along and be common to a row of picture elements to form a passive matrix addressing arrangement.

Alternatively, the third electrode may be common to all of the picture elements and each of the first electrodes may comprise a picture element electrode connected to an active non-linear device to form an active matrix addressing arrangement.

The phrase "active non-linear device" is used in this application to describe a three terminal switch, e.g., a thin film transistor (TFT), and a two terminal non-linear device, e.g., a thin film diode (TFD) or a Metal-Insulator-Metal (MIM) device.

A first electrically insulating layer may be disposed on the or each second electrode. The or each second electrode may be transparent and the refractive index of the first insulating layer may be substantially equal to the refractive index of the or each second electrode. The or each second electrode may be transparent and the first insulating layer may be planarised.

A second electrically insulating layer may be disposed between the first electrode and the or each second electrode, The second insulating layer may have a refractive index substantially equal to the refractive index of the or each second electrode.

An eighth aspect of the present invention provides a liquid crystal device comprising first and second substrates, a layer of liquid crystal disposed between the first and second substrates, and a plurality of picture elements, each of which comprises a first electrode disposed on the first substrate, a plurality of laterally spaced second electrodes electrically insulated from and disposed above the first electrode relative to the substrate, and a third electrode disposed on the second substrate; and wherein a first electrically insulating layer is disposed over the second electrodes, the refractive index of the first insulating layer being substantially equal to the refractive index of the second electrodes.

A ninth aspect of the present invention provides a liquid crystal device comprising first and second substrates, a layer of liquid crystal disposed between the first and second substrates, and a plurality of picture elements, each of which comprises a first electrode disposed on the first substrate, a second electrode electrically insulated from and disposed above the first electrode relative to the substrate, and a third electrode disposed on the second substrate; wherein the second electrode extends over a central area of the pixel and a plurality of apertures are provided in the second electrode; and wherein a first electrically insulating layer is disposed over the second electrode, the refractive index of the first insulating layer being substantially equal to the refractive index of the second electrode.

The second electrode may extend over substantially the entire area of the pixel.

The or each second electrode may be transparent, and the first insulating layer may be planarised.

The device may comprise a waveplate disposed on the first substrate. The waveplate may comprise the second insulating layer. The waveplate may comprise the first insulating layer.

The device may comprise a reflector disposed on the first substrate. The reflector may comprise a dielectric reflector. The reflector may comprise the first electrodes. The reflector may comprise the or each second electrode. It may be a combination of any two of, or all of, these three.

The thickness of the second insulating layer may be substantially equal to $(m+1)\lambda/2n$, where m is an integer greater than or equal to zero, $\lambda$ is a wavelength of optical radiation, and n is the refractive index of the second insulating layer.

The first insulating layer on each of the second electrodes may have a thickness $d_2$ and a refractive index $n_2$, the first electrodes may be covered by a third insulating material having a refractive index $n_1$ and an upper surface relative to the substrate at least as high as upper surfaces of the first insulating layer, and the depth $d_1$ from the upper surfaces of the first insulating layer to the first electrodes may be such that $n_1 d_1 \equiv n_2 d_2$. The third insulating material may be disposed over the first insulating layer.

The device may comprise further reflecting electrodes disposed below gaps between the first electrodes relative to the first substrate, the first electrodes and the further electrodes being disposed in an electrically insulating material having a refractive index n with the further electrodes being disposed at a depth below the first electrodes substantially equal to $(m+1)\lambda/2n$, where m is an integer greater than or equal to zero and $\lambda$ is a wavelength of optical radiation.

The second electrodes disposed over gaps between the first electrodes may be reflective and the second electrodes not disposed over gaps between the first electrodes may be transparent; and the second insulating layer may have a thickness substantially equal to $(m+1)\lambda/2n$, where m is an integer greater than or equal to zero, $\lambda$ is a wavelength of optical radiation, and n is the refractive index of the second insulating layer.

$\lambda$ may be substantially equal to 550 nanometers.

A plurality of transparent second electrodes may be provided in each pixel; the first electrodes may be reflective; and a plurality of phase compensating members may be disposed over the first electrodes in registration with gaps between second electrodes, the optical phase difference induced by the phase compensating members being substantially equal to the optical phase difference induced by the second electrodes.

The phase compensating members may be disposed on the first electrodes.

It is thus possible to provide an electrode structure which allows liquid crystal material to be switched at very high resolution. Such a structure allows a field profile which is substantially perpendicular to the substrates and of substantially "square" profile to be produced at fine electrode pitches, for instance less than 10 micrometers. Higher resolution switching of certain NLC, FLC and AFLC liquid crystal modes can be achieved. For a given lithographic feature size and when compared with known devices having single layer electrode structures (for instance as disclosed in GB 2 313 920 and EP 0 811 872), higher resolution liquid crystal switching can be achieved by means of the twin layer electrode structure. When compared with the highest resolution single layer electrode structure defined as a unity mark-space ratio for a given lithographic feature size, the twin layer electrode structure provides improved field shape for higher resolution liquid crystal response. For instance, pitches as small as 2 micrometers may be achieved with NLCs and FLCs. A single layer electrode arrangement of known type would have to be implemented with interdigitated electrodes to achieve the same pitch and the field shape would not be equivalent to that produced by the twin layer structure unless very high resolution lithography were used.

The present electrode structure is physically and electrically compatible with active matrix addressing arrangements, such as thin film transistor (TFT) back planes and large scale integration (LSI) back planes, and passive matrix addressing arrangements. For instance, the electrode structure allows high effective aperture ratios to be obtained with reflective TFT back planes. It is also possible to produce high angle diffractive liquid crystal devices with NLCs, FLCs and AFLCs. Further, improved control of inter-pixel gap switching may be achieved in high resolution liquid crystal displays. Also, electrode structure may be used to provide pixel storage capacitance which can result in a more compact pixel layout. Thus, improved diffraction based liquid crystal spatial light modulators may be provided for projection displays.

The invention will be further described, by way of example, with reference to the accompanying drawings, in which:

BRIEF DESCRIPTION OF THE DRAWINGS

FIG. 7 is a diagrammatic cross sectional view of the device shown in FIG. 6 illustrating the equi-potential profile;

FIG. 8 is a cross sectional view of two pixels of a passively addressed reflective liquid crystal device constituting a third embodiment of the invention;

FIG. 9 is a cross sectional view of two pixels of a passively addressed reflective liquid crystal device constituting a fourth embodiment of the invention;

FIG. 10 is a cross sectional view of two pixels of a passively addressed reflective liquid crystal device constituting a fifth embodiment of the invention;

FIG. 11 is a cross sectional view of two pixels of a passively addressed reflective liquid crystal device constituting a sixth embodiment of the invention;

FIG. 12 is a cross sectional view of two pixels of an active matrix addressed reflective liquid crystal device constituting a seventh embodiment of the invention;

FIG. 15 is a partial cross sectional diagram illustrating light paths in a reflective active matrix device similar to that shown in FIG. 12, but further including a buried reflector disposed under the pixel electrodes;

FIG. 16 is a partial cross sectional diagram illustrating light paths in a reflective active matrix device having reflective finger electrodes;

DETAILED DESCRIPTION OF THE INVENTION

Figure 1:
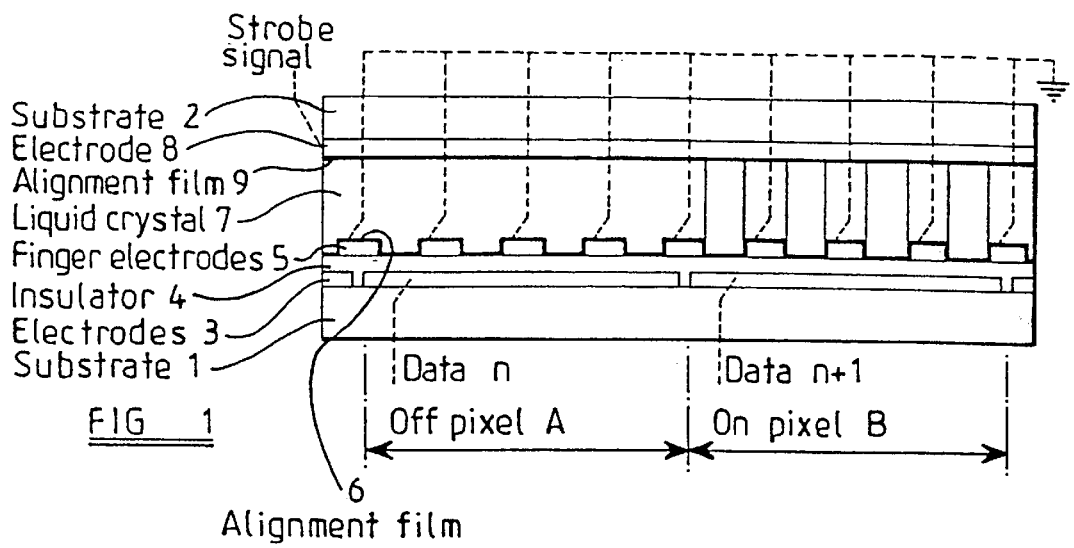
FIG. 1 is a cross sectional view of two pixels of a passively addressed liquid crystal device constituting a first embodiment of the invention.

Like reference numerals refer to like parts throughout the drawings.

FIG. 1 shows two adjacent pixels A and B of a passively addressed transmissive liquid crystal device. The device comprises a regular array of such pixels, for instance arranged as rows and columns. The device may be used as a spatial light modulator or as a display, for instance in a projection display based on switching the pixels between phase-only diffractive and non-diffractive modes. The device comprises a first substrate 1 and a second substrate 2, for instance made of glass plates. The substrate 1 carries an electrode arrangement comprising transparent electrodes 3, for instance made of indium-tin oxide (ITO). The electrodes 3 are arranged as parallel stripe-shaped column electrodes, each of which is common to the pixels in that column. The pixel A is shown as receiving Data n from a column data driver (not shown) whereas the pixel B is shown as receiving Data n+1 from the driver.

The electrodes 3 are buried in an insulator 4 comprising a layer of insulating material such as polyimide which is formed on the electrodes 3 by spin-coating. However, other materials and forming techniques may be used, such as spin-coating with silicon dioxide, chemical vapour deposition (CVD) of silicon dioxide and CVD of silicon nitride. The electrodes 3 have a thickness determined by the required resistivity and transmissivity and are typically 20 nanometers thick. The insulator 4 is of a depth sufficient to provide electrical insulation and is typically between 100 and 200 nanometers thick.

Figure 2:
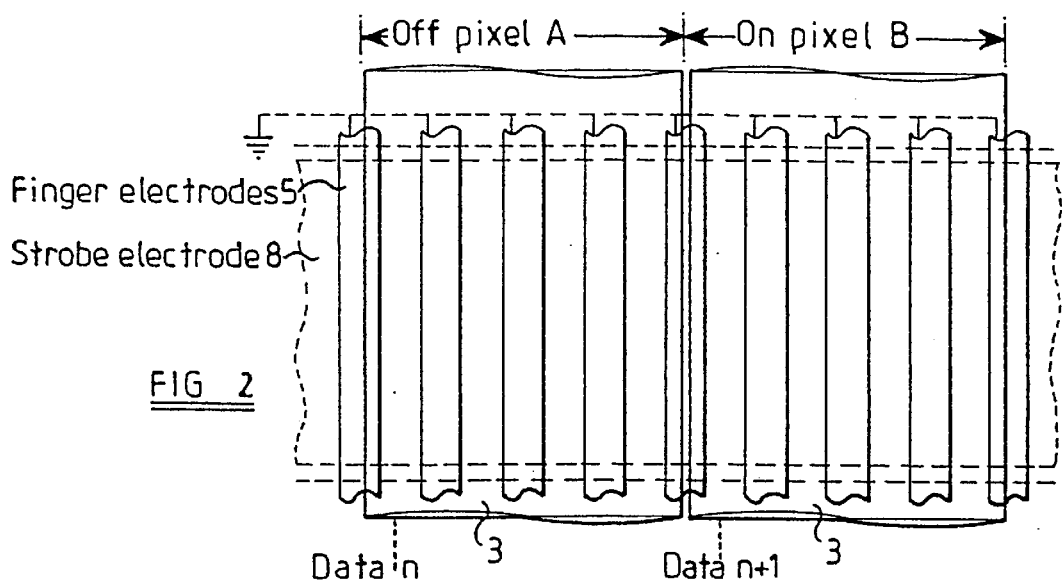
FIG. 2 is a diagrammatic plan view of the pixels shown in FIG. 1.

Second "finger" electrodes 5 are formed on the upper surface of the insulator 4. The electrodes 5 are transparent and may also be made of ITO with a thickness of the order of 20 nanometers. The second electrodes 5 are formed as striped parallel evenly spaced electrodes which extend throughout the transverse extent of the device. The pitch of the second electrodes 5 is much finer than the lateral pitch of the pixels A, B. Typically, the lateral pixel pitch is at least three times that of the second electrodes 5. For instance, the lateral pixel pitch may be 28 micrometers and the lateral second electrode pitch may be 7 micrometers. However, the range of suitable pitches is limited only by lithographic limits and the desired size of the device. (The words "transverse", "lateral" refer to a pixel oriented as shown in FIG. 2).

The electrodes 5 and the insulator 4 are covered by an alignment layer 6 for aligning a liquid crystal 7 in the form of a layer between the substrates 1 and 2. The alignment layer or film 6 may comprise polyimide which is spin-coated and immidised at approximately 250° C. to form a layer having a thickness of approximately 100 nanometers. The liquid crystal 7 may be, for example, NLC, PLC or AFLC.

A suitable NLC is E7 from Merck. This can be used in a super-twisted nematic passively addressed mode, or in a bistable twisted nematic passively addressed mode. An example of a suitable FLC for passive matrix addressing is SCE8 from Hoechst whilst a suitable AFLC for passive matrix addressing is CS4000 from Chisso Corporation.

Further embodiments of this invention are described below which use active matrix addressing. A suitable NLC for active matrix addressing is ZLI-4792 from Merck. The FLC mentioned above, SCE8 from Hoechst, is suitable for use also in an active matrix device. An AFLC possibly suited to active matrix addressing is the thresholdless AFLC MLC0076 as described by S. S. Seomun et al. in "Electrooptic Properties of a Binary Mixture of Ferroelectric and Anti-Ferroelectric Chiral Components showing Thresholdless S-shaped Switching", Third International Display Workshops, Lcp 1–4 (1996) P61–64.

Of the liquid crystal modes described above, the BTN and FLC provide binary modes, whereas the others provide analogue modes. However, it is possible also to use the BTN and FLC in analogue modes, as described in co-pending UK Patent Application No. 9712134.7

The substrate 2 has formed thereon third transparent electrodes 8, for instance made of ITO and having a thickness typically of 100 nanometers. The electrodes 8 are similar to the electrodes 3, but extend in the lateral direction of the device to form row electrodes, each of which is common to the pixels in that row. The electrodes 8 are connected to a strobe signal generator (not shown) for supplying strobe signals to the electrodes 8 in turn so as to refresh the pixels of each row in turn with the current image data for that row. Passive matrix addressing arrangements of this type are well known and will therefore not be described in detail.

The electrodes 8 are covered by an alignment layer or film 9 for aligning the liquid crystal 7. The alignment layer 9 may be formed in the same way as the alignment film 6 and is then subjected to a rubbing process to provide the required directional liquid crystal alignment.

The extent of each pixel is defined by the intersection or overlap of the first "data" electrodes 3 and the third "strobe" electrodes 8. Each of the first electrodes 3 is continuous transversely throughout the extent of the pixel. Similarly, each of the electrodes 8 is continuous throughout the lateral extent of the pixel. (The words "transversely", "lateral" refer to a pixel oriented as shown in FIG. 2). FIG. 1 illustrates diagrammatically the pixel A in the off state and the pixel B in the on state.

As shown in FIGS. 1 and 2, the pixels A and B are addressed using passive matrix techniques. The second or finger electrodes 5 are connected together and to ground, the first electrodes 3 receive the data signals and the third electrodes 8 receive the strobe signals. The type of data and strobe signals supplied to the electrodes 1 and 8 depends on the specific liquid crystal mode used in the device. The strobe and data signals could be interchanged such that the electrodes 3 receive the strobe signals and the electrodes 8 receive the data signals. Although the finger electrodes 5 are shown parallel to the data electrodes (third electrodes) in FIG. 2 they can have any orientation relative to the first and third electrodes.

Figure 3:
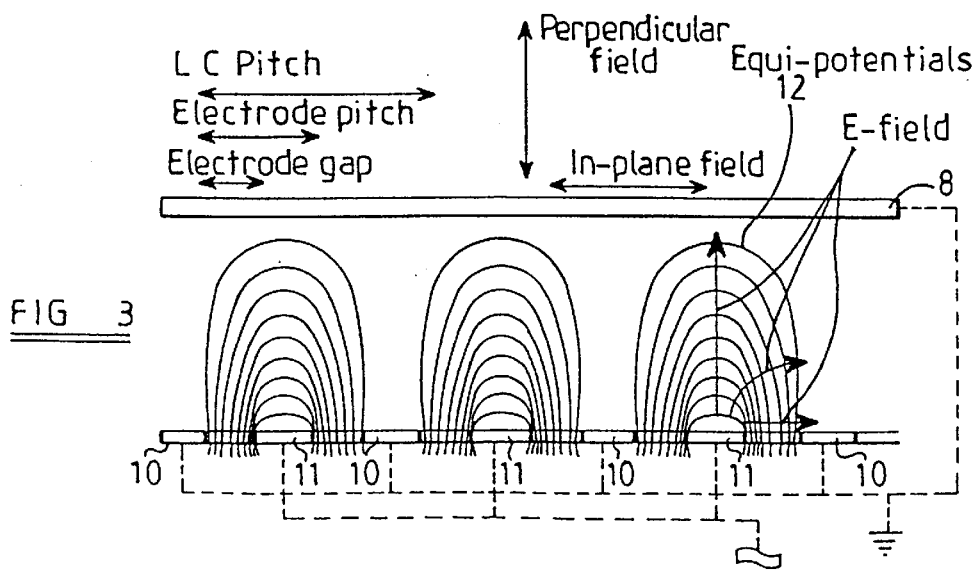
FIGS. 3 and 4 are diagrammatic cross sectional views of known electrode arrangements and the resulting equi-potential profiles.
Figure 4:
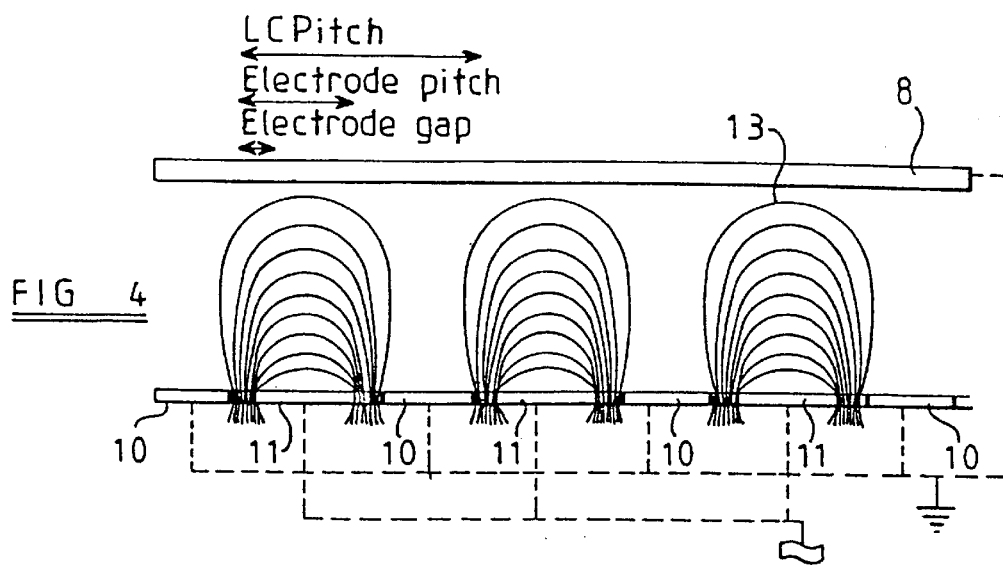
Figure 5:
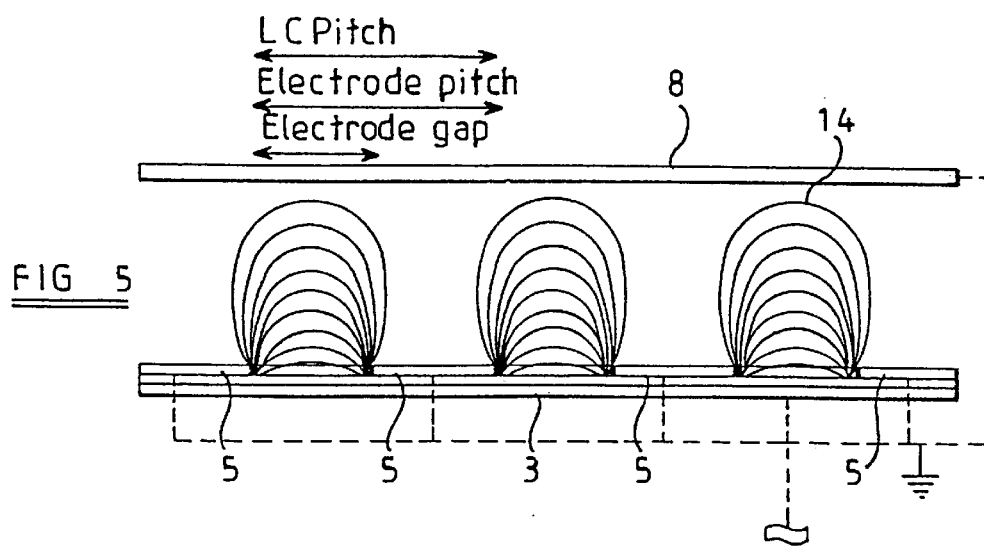
FIG. 5 is a diagrammatic cross sectional view of the twin layer electrode arrangement shown in FIG. 1 illustrating the equi-potential profile.

FIGS. 3 to 5 illustrate the equi-potentials obtained with three different electrode structures. The electrode structure shown in FIG. 3 is of the conventional single layer type in which the lower electrode arrangement comprises evenly spaced parallel striped electrodes 10, 11 with a mark-space (electrode: electrode gap) ratio of 1. Alternate ones 10 of the striped electrodes are connected to the upper electrode 8 so as to be at the same voltage (ground potential as shown in FIG. 3). The other striped electrodes 11 are connected together and are held at a suitable bias voltage relative to the electrodes 8 and 10.

The equi-potentials resulting from the configuration shown in FIG. 3 are illustrated at 12. This configuration produces electric fields which spread laterally to produce in-plane field components over a relatively wide region in addition to the desired perpendicular field component. Thus, although the electrode mark-space ratio is equal to 1, the mark-space ratio of the field pattern and hence of the resultant liquid crystal switched profile is far from a value of 1. This results from the gaps between the electrodes 10 and 11 where the electric field is not adequately controlled.

As shown in FIG. 4, the electric field profile may be improved by modifying the mark-space ratios of the electrodes 10 and 11 so as to reduce the width of the gaps between the electrodes 10 and 11. FIG. 4 illustrates the case where the electrodes 10 and 11 are three times as wide as the gaps to give a mark-space ratio of 3. In this case, the mark-space ratio of the electric field profile is much closer to 1 and the profiles of the equi-potentials 13 are such that the in-plane fields are confined to much smaller regions. However, the peak field is very much larger. There is a trade-off between the width of the in-plane field region and the strength of the in-plane fields and the electric and visco-elastic properties of the liquid crystal material. FIGS. 3 and 4 illustrate that the electrode widths may be optimised for the required field profile mark-space ratio but, for a given lithographic line width, the resulting grating pitch must be larger.

FIG. 5 illustrates the equi-potentials 14 for the electrode structure shown in FIGS. 1 and 2. The twin layer electrode structure comprising the electrodes 3 and the finger electrodes 5 provides an electric field profile which would be obtained from the single layer electrode structure of FIG. 4 in the limit when the gaps between the electrodes 10 and 11 tend to zero so that the mark-space ratio of the electrodes tends to infinity. The need for alternately biasing the finger electrodes is removed and the minimum lithographic features size is increased by a factor of 2 for the twin electrode layer structure. Thus, higher resolution liquid crystal switching may be achieved for the same lithographic resolution of the electrodes. Thus, the mark-space ratio of the field pattern and the resultant liquid crystal switched profile are much closer to 1 and the "square" electric field profile is more nearly achieved with the twin layer electrode structure shown in FIGS. 1 and 2.

Figure 6:
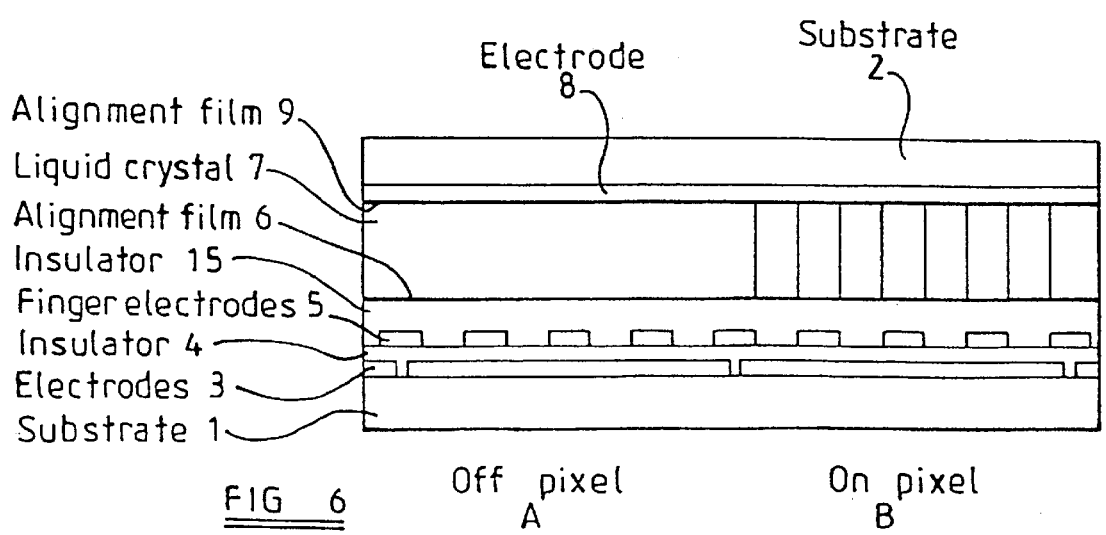
FIG. 6 is a cross sectional view of two pixels of a passively addressed liquid crystal device constituting a second embodiment of the invention.

In-plane fields can cause the liquid crystal 7 to switch in an undesirable configuration which can compromise display efficiency or switching speed. FIG. 6 illustrates a device in which is effect is substantially reduced. The device of FIG. 6 differs from that of FIG. 1 in that an insulator 15 is formed as a layer between the alignment layer 6 and the insulator 4 and electrodes 5. For instance, the insulator 15 may be formed by spin-coating with a suitable material such as polyimide.

FIG. 7 shows the electric field vectors 16 for the device shown in FIG. 6. The region such as 17 with the highest density of equi-potentials and with the highest in-plane electric fields is confined to the insulator 15 so that the tendency for in-plane switching of the liquid crystal 7 is substantially reduced. Consequently, there is a reduction in domain edge defects or twist boundaries which typically occur between regions of different switched states in the liquid crystal 7.

Diffraction effects caused by the electrodes 5 can cause a reduction in the performance of the device. Where the device is used as a display, this can compromise the brightness and/or contrast ratio. In order to reduce this effect, the electrodes 5 are "optically buried" by using a material for the insulator 15 which is refractive-index matched to the material of the electrodes 5, such as ITO. Also, surface planarisation of the insulator 15 further reduces optical diffraction effects. The layer 15 may be planarised by polishing, by the use of reflow-planarisation polymeric materials, by etchback following the use of reflow-planarisation materials, by sputter deposition and by sputter-etch techniques.

Whereas the embodiments described hereinbefore are of the transmissive type, the embodiments described hereinafter are of the reflective type. Thus, FIG. 8 illustrates a liquid crystal device of the passively addressed type which differs from that shown in FIG. 1 in that the first electrodes 3 are reflective. For instance, the electrodes 3 may be formed of silver or another highly reflective metal. Alternatively or additionally, the insulator 4 may be formed of an insulative reflective dielectric multi-layer stack. The combination of reflecting electrodes 3 and a relatively few layers in a dielectric stack may be advantageous n limiting the total thickness.

The device shown in FIG. 9 differs from that shown in FIG. 8 in that a waveplate 15' is formed between the alignment layer 6 and the finger electrodes 5. Such a waveplate may be advantageous for certain liquid crystal modes.

The waveplate 15' may be made of a liquid crystal reactive mesogen. In order to form the waveplate 15', the insulator 4 and the finger electrodes 5 are coated with an alignment layer or film 18, for instance of the same type as the alignment layer 6. The alignment layer 18 is spin-coated with the reactive mesogen, which is then cured before forming the alignment layer 6.

The reactive mesogen waveplate 15' is an insulator and also acts as a "buffer" layer for containing the highest of the in-plane electric fields as described hereinbefore with reference to the insulator 15 in FIG. 6.

Although the waveplate is shown in a reflective device, such a waveplate may also be provided in a transmissive device.

The waveplate 15' typically comprises a thick layer, for instance of 800 nanometer thickness, with a high permittivity, for instance of the order of 8. The waveplate 15' therefore acts as a capacitance in series with the liquid crystal layer 7. It may therefore be necessary to provide higher pixel drive voltages in order to achieve the required electric field across the liquid crystal 7.

FIG. 10 illustrates a device which differs from that shown in FIG. 9 in that the layer 4' constitutes the waveplate and the layer 15 comprises a planarised insulating layer. The waveplate 4' may be formed as described hereinbefore for the waveplate 15' of FIG. 9 and a suitable alignment layer or film 19 is shown in FIG. 10. The insulating layer 15 may therefore be made thinner so that the required drive voltage may be reduced as compared with the device shown in FIG. 9.

FIG. 11 shows a device which differs from that shown in FIG. 9 in that a planarising insulator 20 is formed over the finger electrodes 5 between the insulator 4 and the alignment layer 18. The material of the insulator 20 is refractive index matched to the finger electrodes 5 and is planarised at its upper surface so as to reduce diffraction effects as described hereinbefore.

Figure 13:
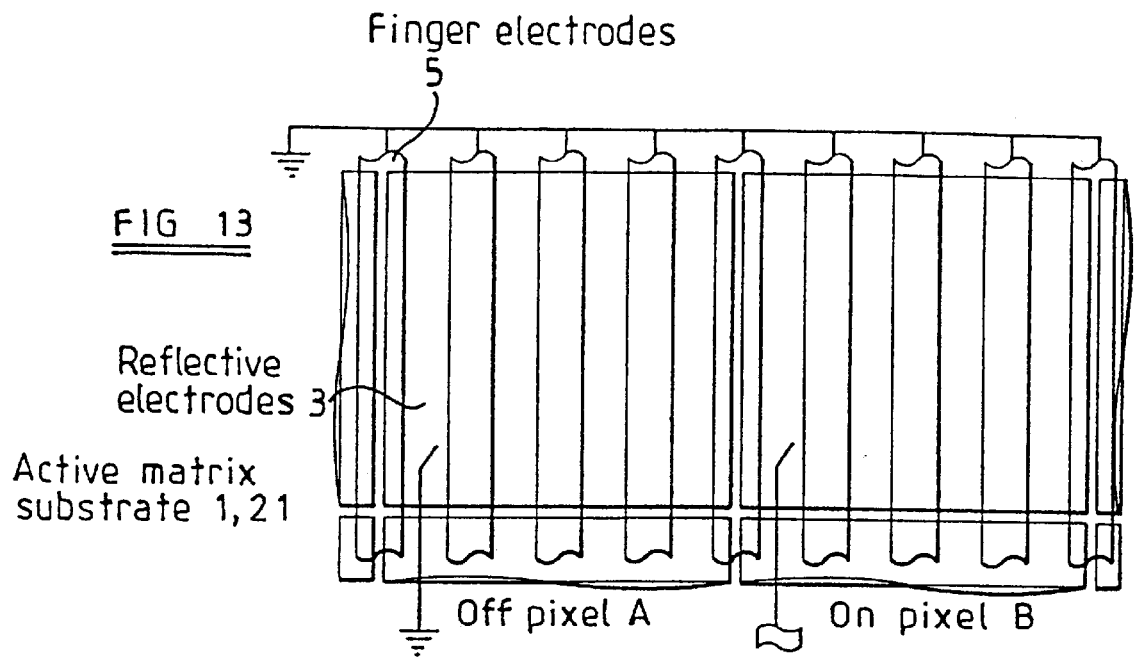
FIG. 13 is a diagrammatic plan view of the pixels shown in FIG. 13.

FIG. 12 illustrates a liquid crystal device having a structure which is similar to that shown in FIG. 9 but which is of the active matrix type. Thus, a planarised active matrix circuit 21 is formed on the substrate 1 before the other elements of the device are formed. The first electrodes 3 comprise reflective pixel electrodes as illustrated in FIG. 13 with the shape of the electrodes 3 defining the shape of the pixels. The electrode 8 comprises a plane continuous electrode which is common to all of the pixels and which is grounded together with the finger electrodes 5. Each of the electrodes 3 is connected to the underlying drive circuitry of the circuit 21 by means of a via-hole.

Figure 14:
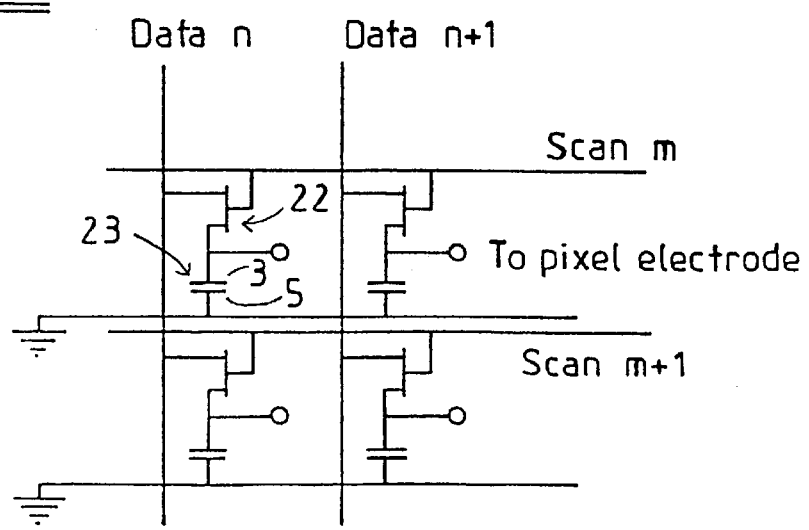
FIG. 14 is a schematic circuit diagram of pixels of the display shown in FIG. 12.

FIG. 14 illustrates typical pixel circuitry of the device of FIG. 12. Each pixel electrode 3 is connected to the source of a thin film transistor 22. The gates of the TFTs 22 of each row of pixels are connected together and to a common strobe or scan line. Similarly, the drains of the TFTs of the pixels in each column are connected together and to a common data line.

The twin layer electrode structure shown in FIG. 12 forms a capacitor at each pixel. In particular, the electrode 3 of each pixel forms one plate of the capacitor whereas the finger electrodes 5 of that pixel form the other plate, as shown schematically in FIG. 14 by the capacitor 23. In TFT displays, pixel capacitors are generally used for charge storage in order to maintain a given voltage across the liquid crystal 7 during the display update period. The capacitors 23 formed by the electrodes 3 and 5 automatically provide this function so that separate capacitors may not be needed, resulting in space saving and a smaller ultimate pixel size. Even if the capacitors 23 formed by the electrodes 3 and 5 are not sufficient to eliminate completely the need to provide supplementary storage capacitors, smaller supplementary storage capacitors than hitherto will be required owing to the presence of the capacitors 23 formed by the electrodes 3 and 5. It is preferable for the capacitance of the capacitor 23 to be approximately ten times that of the liquid crystal capacitance of the pixel and this may be achieved by suitably selecting the thickness of the insulating layer 4.

In the case of a reflective device, for instance for use as a phase-only diffracting spatial light modulator in a projection display, planarisation of the finger electrodes 5 using an index matched insulating layer 15, 15' removes or substantially reduces the most critical unwanted diffraction, namely that which occurs at the same angle as intentionally diffracted light. However, the electrode boundaries defining the pixels can also cause poor control of a proportion of the incident light because of unwanted diffraction. In the case of passive matrix devices, for instance as described hereinbefore, such unwanted diffraction typically takes place in one dimension only because the reflective electrodes have a striped form and projection optics associated with the device can discriminate the unwanted diffraction components. In the case of active matrix devices, the diffraction at the pixel boundary occurs in two dimensions because the reflective pixel electrodes 3 are generally square or rectangular. Thus, discrimination against unwanted diffraction is difficult within an associated optical system.

FIG. 15 illustrates optical paths within a pixel structure of a typical active matrix device having transparent finger electrodes 5 and reflective pixel electrodes 3. (FIG. 15 shows only the lower substrate of the device and does not show the liquid crystal layer and upper substrate.) In order to provide further reduction in diffraction from the finger electrodes 5, the distance $d_1$ between the electrodes 3 and 5 is optimally approximately equal to $\lambda/2n_1$, where $n_1$ is the refractive index of the insulating layer 4 and $\lambda$ is the design wavelength of the display, typically of the order of 550 nanometers.

FIG. 15 also illustrates the use of an insulating layer 24 between the reflective pixel electrodes 3 and the planarised active matrix substrate 1, 21. Reflective inter-pixel electrodes 25 are buried in the insulating layer 24 below the gaps between the pixel electrodes 3 and hence between the pixels of the device. In order for such a buried reflective electrode 25 to be effective in reducing unwanted diffraction, the depth $d_2$ of the electrodes 25 below the electrodes 23 is approximately equal to $(2m+1)\lambda/2n_1$ where m is a non-negative integer and it is assumed that the refractive indices of the insulating layers 4 and 24 in the optical path are identical.

The value of $d_1$ is appropriate for highly reflective electrodes whereas the value of $d_2$ is appropriate for highly transmissive electrodes buried in an index matched film. For transmissive finger electrodes generating partial reflections at each interface, the thickness optimisation may be calculated using wave propagation analysis.

The optical paths of incident light reflected by the electrodes 3 and the electrodes 25 are illustrated at 26 and 27, respectively, in FIG. 15.

FIG. 16 illustrates an arrangement which differs from that shows in FIG. 15 in that the finger electrodes 5 are reflective and the electrodes 25 are omitted (FIG. 16 shows only the lower substrate of the device and does not show the liquid crystal layer and upper substrate.) For instance, the finger electrodes 5 may be made of silver or aluminum. The finger electrodes 5 are arranged to cover the gaps between the pixel electrodes 3. Matching of the length of the optical pates 26 and 28 reduces diffraction effects and is achieved by ensuring that the extra total path length of the path 26 compared with the patch 28 is a multiple of a wavelength. This may be achieved by making the depth d of the pixel electrodes 3 below the finger electrodes 5 equal to $(2m+1)\lambda/2n_1$ are as defined hereinbefore.

The arrangements shown in FIGS. 15 and 16 are such that the suppression of unwanted diffraction from the finger electrodes 5 occurs over only a limited optical bandwidth.

Figure 17:
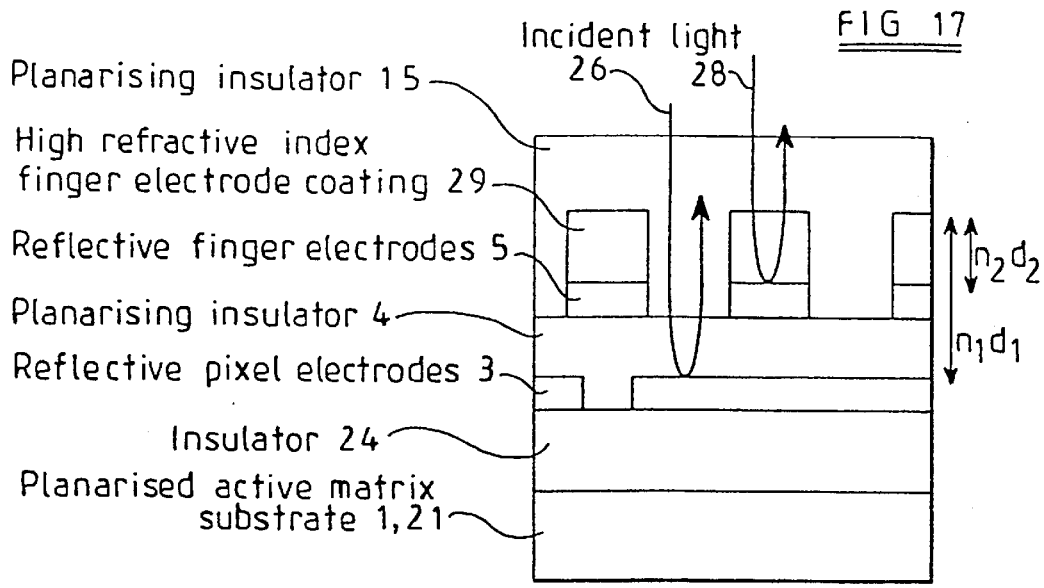
FIG. 17 is a partial cross sectional diagram illustrating light paths in a reflective active matrix device having reflective finger electrodes coated with high refractive index film.

FIG. 17 shows an arrangement for suppressing unwanted diffraction from the electrodes 5 which is not dependent on design wavelength and which is therefore effective over a wider optical bandwidth. (FIG. 17 shows only the lower substrate of the device and does not show the liquid crystal layer and upper substrate.) The arrangement of FIG. 17 differs from that of FIG. 16 in that the reflective finger electrodes 5 are covered with a high refractive index coating 29. With a sufficiently high difference between the refractive index $n_1$ of the layers 4 and 15 and the refractive index $n_2$ of the coating 29, the coating 29 may have a reasonable thickness in order to eliminate the optical path difference between the optical paths 26 and 28. Suppression of diffraction effects is achieved when $n_1 d_1 = n_2 d_2$, where $d_1$ is the depth of the pixel electrodes 3 below the top of the coating 29 and $d_2$ is the thickness of the coating 29. For example where the layers 4 and 15 are made of a polymer whose refractive index is $n_1=1.5$ and the coating 29 is made of silicon nitride whose refractive index is $n_2=2$, and where $(d_1-d_2)=200$ nanometers, $d_2$ is approximately 600 nanometers.

Figure 18:
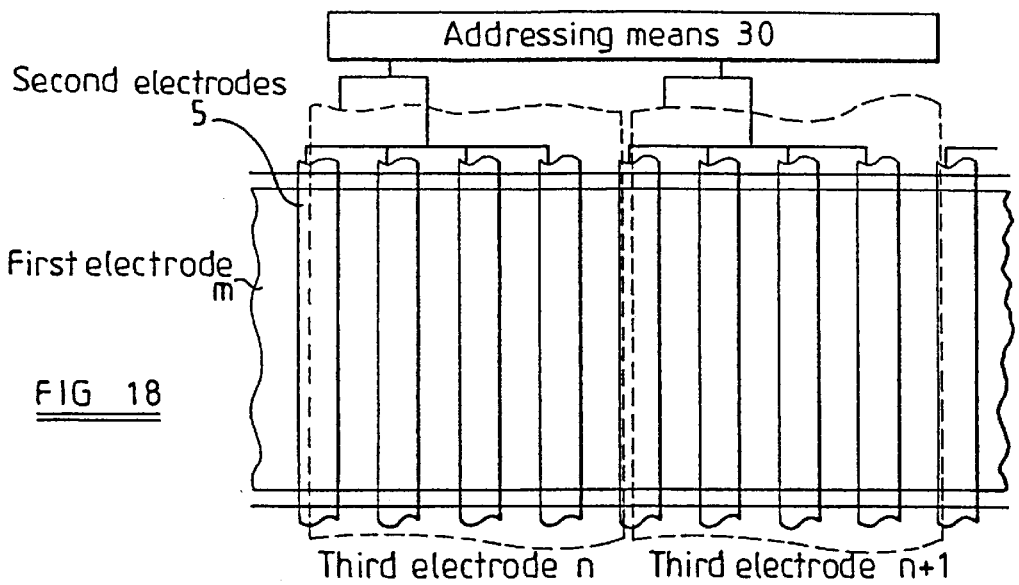
FIG. 18 is a cross sectional view corresponding to FIG. 1, but illustrating another addressing means of this invention.

FIG. 18 is a schematic illustration of a device similar to the device of FIG. 1, but further comprising addressing means 30. The addressing means 30 is able to address the finger electrodes in one column of pixels independently from finger electrodes in other columns of pixels. This embodiment has the advantage of improving switching control, particularly when the liquid crystal layer in the device is an FLC. As is well known, one method of switching an FLC involves "blanking" pixels to a known state and subsequently putting the pixels into a desired new display state. The embodiment of FIG. 18 allows blanking of pixels to be carried out row by row, and this can improve the accuracy of the subsequent grey level state selection.

Although FIG. 18 shows that the second electrodes corresponding to one column of pixels are addressed independently from second electrodes corresponding to other columns, it could equally well be arranged for the second electrodes corresponding to one row of pixels to be addressed independently from second electrodes corresponding to other rows of pixels.

Figure 19:
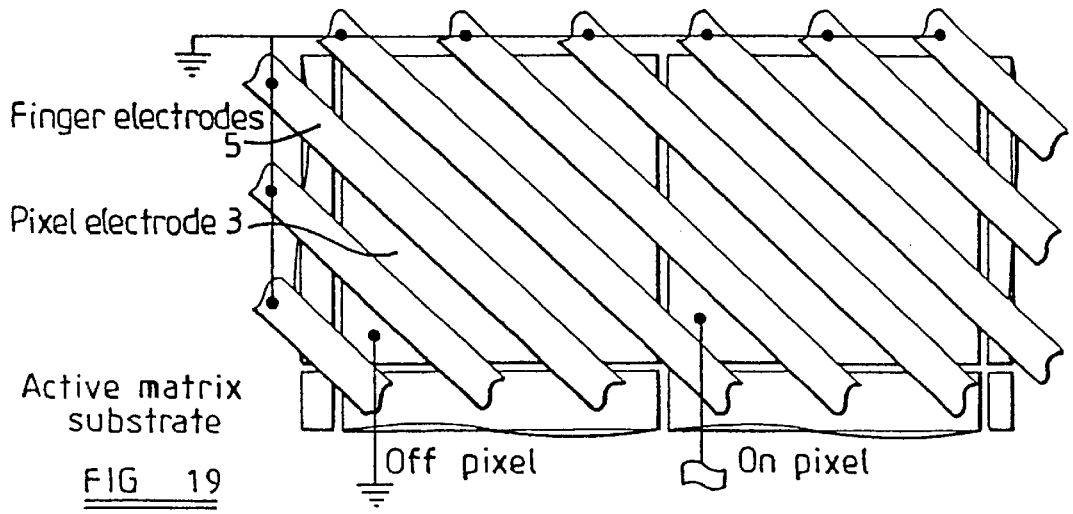
FIG. 19 is a cross sectional view of another embodiment of the invention.

A further embodiment of the invention is illustrated in FIG. 19. This Figure shows an active matrix device in which pixels are arranged in rows and columns. The finger electrodes 5 are not, however, aligned in the row or column direction. They are at substantially 45° to the row and column directions.

In this embodiment, the light deflected from the grating defined in the liquid crystal when a pixel is switched ON lies in a plane which is at 45° to both sets of deflected orders that arise owing to deflection from the underlying pixel electrodes. By placing the finger electrodes at an acute angle to the row direction, it is possible to avoid collecting unwanted deflected light.

Although the finger electrodes are shown at 45° to the row direction in FIG. 19, this embodiment is not limited to an angle of 45°. The preferred angle between the finger electrodes and the row direction will depend on the optical system used. With a circular source image, an angle of 45° is preferred. If an arc source is used, however, an angle of 45° will not give the best results since an arc source is somewhat one-dimensional.

In the embodiment of FIG. 19 the finger electrodes are all connected to earth. However, it would be possible to apply other addressing methods to the device of FIG. 19—such as, for example the addressing method illustrated with respect to FIG. 18.

It is also possible to apply the teaching of FIG. 19 to a passively addressed liquid crystal display, by disposing the finger electrodes at an angle to the strobe and data electrodes.

Although the devices of FIGS. 18 and 19 have been illustrated with reference to a device as shown in FIG. 1, the features of FIGS. 18 and 19 can be applied to any other of the devices described herein above.

Figure 20:
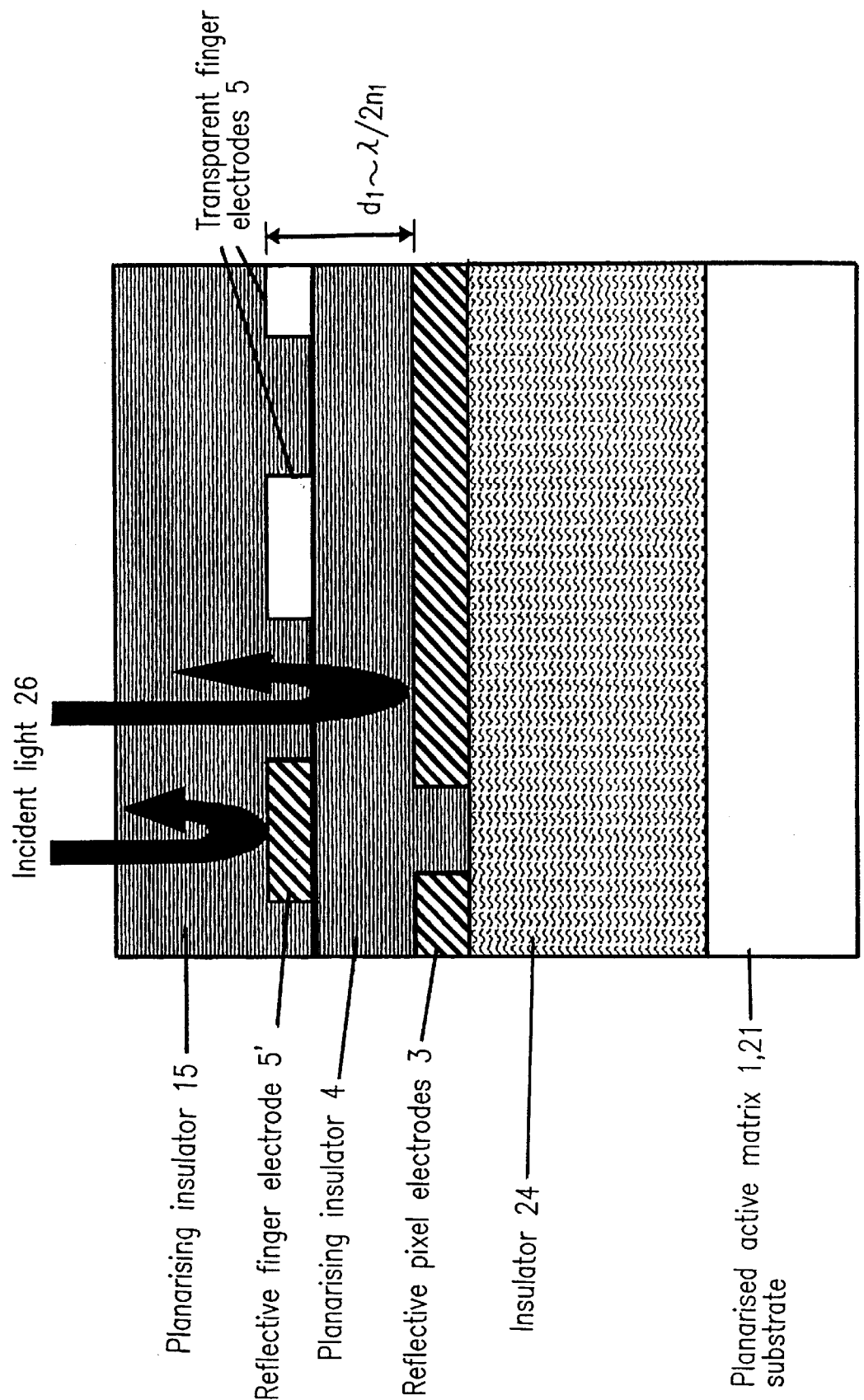
FIG. 20 is a cross sectional view of another embodiment of the invention.

FIG. 20 is a cross sectional view of the lower substrate for a liquid crystal display device according to a further embodiment of the invention. This embodiment differs from that of FIG. 15 in that the finger electrode 5' disposed over the gap between adjacent pixel electrodes 3 is reflective, while the remaining finger electrodes 5 are transparent. Both the reflective finger electrode 5' and the transparent finger electrodes 5 are disposed at a distance of approximately $(m+1)\lambda/2n_1$, where m is 0, 1, 2. . ., above the pixel electrodes 3 ($n_1$ is the refractive index of the insulating layers 4, 15).

The advantage of this embodiment over that of FIG. 15 is that the distance between the reflective finger electrode 5' and the pixel electrodes 3 can be controlled more accurately. It depends only on the deposition uniformity of the lower insulating layer 4, and does not depend on a global planarisation scheme. One possible disadvantage, however, is that the finger electrodes are formed in two separate steps (one step to form the transparent finger electrodes 5 and one to form the reflective finger electrode 5'), so that alignment and registration difficulties may occur. As a result the reflective finger electrode 5' must be made wider than the gap between adjacent pixel electrodes 3, to allow for possible misalignment of the reflective electrode 5'.

Figure 21:
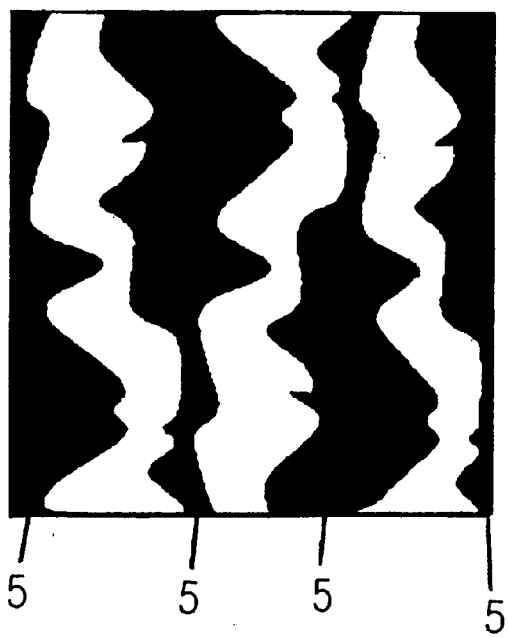
FIG. 21 is a plan view of another embodiment of the invention.

In the preferred embodiments described above, the finger electrodes have had a uniform width and have been substantially regularly spaced. The invention is not limited to this, however. FIG. 21 is a schematic plan view of finger electrodes in a pixel according to another embodiment of the invention. This embodiment again has plurality of finger electrodes that are laterally spaced from one another. The finger electrodes 5 in this embodiment have an irregular width, however, and the spacing between adjacent electrodes varies over the pixel.

The finger electrodes in this embodiment preferably have a pseudo-random shape, so that the shape and spacing of the electrodes varies randomly both within a pixel and from one pixel to another. The area of a pixel covered by the finger electrodes need not be exactly 50%, and is preferably within the range of about 40% to about 60%. Although adjacent finger electrodes are laterally spaced, because of the varying widths of the electrodes it is possible in this embodiment for adjacent finger electrodes within a pixel or in adjacent pixels to touch one other at a point.

The edges of the finger electrodes are defined by, for example, a random walk function. The use of irregularly and/or pseudo-randomly shaped finger electrodes produces scattering rather than 1-dimensional diffraction. Directed scattering can be obtained if the random function defining the edges of the finger electrodes has a weighting factor.

The finger electrodes of FIG. 21 can be reflective or transparent, and can be applied to any of the embodiments described herein above.

Figure 22:
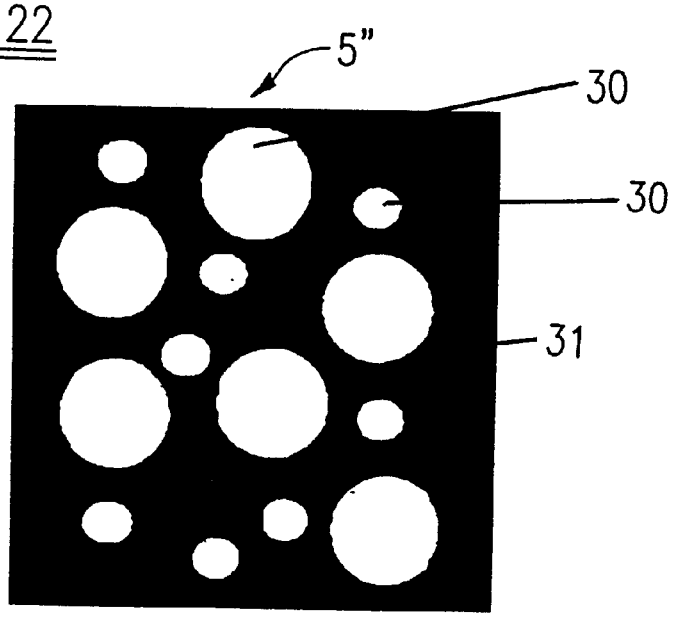
FIG. 22 is a plan view of another embodiment of the invention.

FIG. 22 is a schematic plan view of a pixel according to another embodiment of the invention. In this embodiment only one second electrode 5" is provided in the pixel. The perimeter 31 of the second electrode 5" includes the central area of the pixel, preferably includes substantially the entire area of the pixel, and may include the whole area of the pixel.

A plurality of apertures 30 are provided in the second electrode 5". These are preferably of different sizes, and are preferably disposed at random or pseudo-random locations. The sizes and locations of the apertures can be defined using, for example, a random number generator. Although circular apertures are shown in FIG. 22, apertures having other shapes can also be used. The size, number and positions of the apertures 30 preferably also vary randomly from one pixel to another pixels. The "active area" of the electrode 5"—that is, the area contained within the perimeter 31 of the electrode minus the sum of the areas of the apertures in the electrode—is preferably between about 40% to about 60% of the area of the pixel. The diameter of the apertures (in the case of circular apertures) in the electrode is preferably less than 10 μm, and more preferably less than 5 μm.

In use, the second electrode of FIG. 22 operates in same way as the finger electrodes of the embodiments described above. When a voltage is applied to the first electrodes, the twin layer structure of the first electrodes and the second electrode 5" generates a substantially square electric field in the manner described above with reference to FIG. 5. The second electrode of FIG. 22 is quite different from the orientation control electrode of U.S. Pat. No. 5,608,556, which is intended to generate an in-plane electric field. The active area of the orientation control electrode of U.S. Pat. No. 5,608,556 covers only the periphery of the pixel, and does not extend over a substantial area of the pixel.

It is possible for the second electrodes of adjacent pixels to be continuous with one another. For example, the second electrodes of pixels in a row, or a column, could be continuous with one another, with the second electrodes corresponding to each row, or column, of pixels being addressable independently from one another. Alternatively, the second electrode could be continuous over the entire area of the display device. Alternatively, each pixel could have its own independently addressable second electrode.

The second electrode 5" of FIG. 22 will again produce scattering rather than diffraction.

The second electrode 5" of FIG. 22 can be reflective or transparent, and can applied to any of the embodiments of the invention described hereinabove, except those of FIGS. 19 to 21. In particular, it can be used in embodiments in which the second electrode of a pixel is connected to earth potential, or in embodiments in which the second electrode of a pixel is electrically connected to the third electrode of the pixel.

The second electrodes of FIGS. 21 and 22 are made by any conventional manner.

Figure 23:
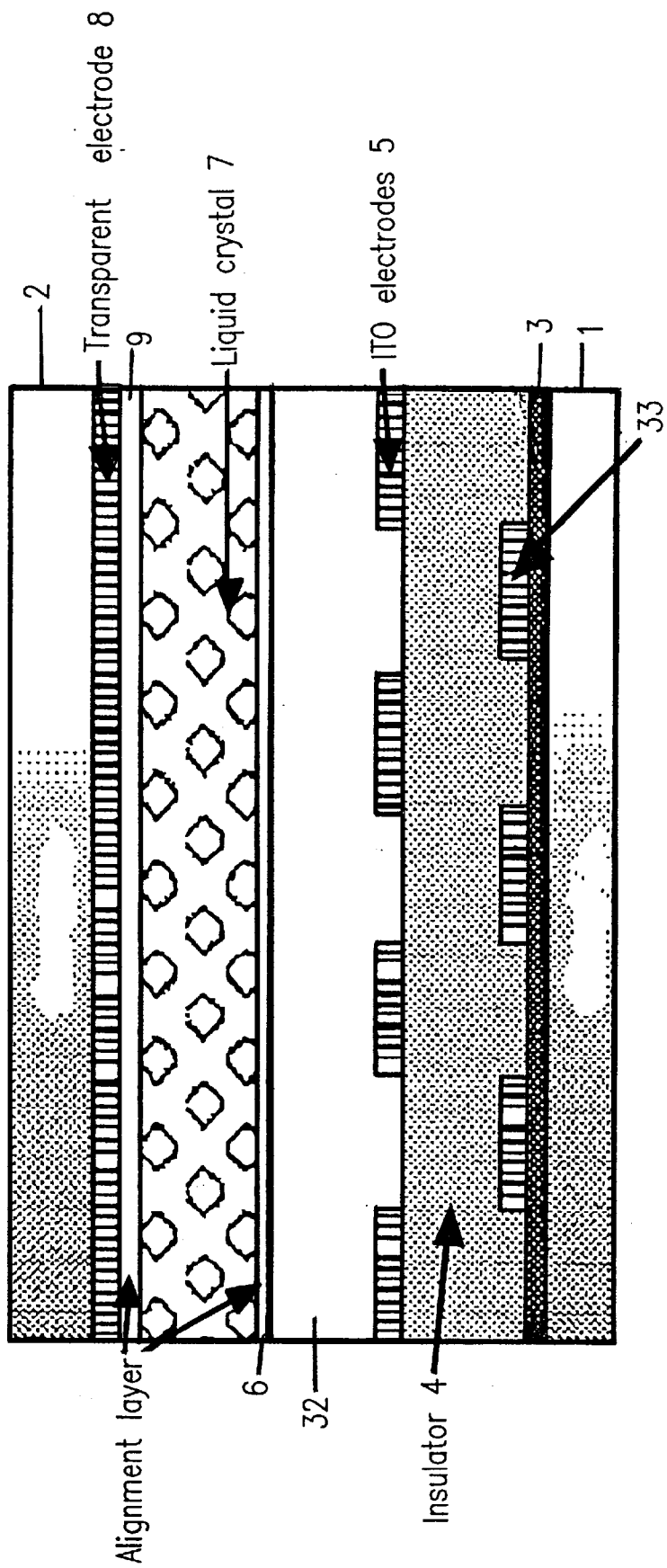
FIG. 23 is a cross sectional view of another embodiment of the invention.

FIG. 23 shows a fisher embodiment of the invention. The device comprises a first substrate 1 and a second substrate 2, for instance made of glass plates. The substrate 1 carries an electrode arrangement comprising reflective first electrodes 3 (pixel electrodes), for instance metallic electrodes (only one first electrode 3 is shown in FIG. 23).

The first electrodes 3 are buried in an insulator 4 comprising a layer of insulating material such as $SiO_2$. The insulator 4 is of a depth sufficient to provide electrical insulation and is typically between 100 and 200 nanometers thick.

Second electrodes 5 are formed on the upper surface of the insulator 4. The electrodes 5 are transparent and may be made of ITO with a thickness of the order of 20 nanometers. The second electrodes 5 are formed as striped parallel evenly spaced electrodes which extend throughout the transverse extent of the device. The pitch of the second electrodes 5 is much finer than the pitch of the pixels of the device (only one pixel is shown in FIG. 23).

A static quarter waveplate 32 is disposed above the second electrodes 5. The composition and manufacture of this waveplate 32 are similar to those of the waveplate 15' of FIG. 9. The quarter waveplate 32 is covered by an alignment layer 6 for aligning a liquid crystal 7 in the form of a layer between the substrates 1 and 2. The alignment layer or film 6 may comprise any conventional alignment layer. The liquid crystal 7 may be, for example, NLC, FLC or AFLC.

A transparent third electrode 8 (a common electrode) made, for example, of ITO is disposed on the upper substrate 2. An alignment layer 9 for aligning the liquid crystal 7 is disposed on the third electrode 8.

The embodiment of FIG. 23 differs from that of FIG. 9 in that phase compensation members 33 are provided. These are transparent strips 33 that are registered with the gaps between adjacent second electrodes 5, and extend substantially parallel to the second electrodes. The transparent strips are disposed in the optical path of light that passes through gaps between adjacent first electrodes 3. In this embodiment, all light reflected by the first electrode 3 passes through either a transparent second electrode 5 or one of the transparent strips 33, If the optical phase difference caused by the transparent strips is equal to the optical phase difference caused by the transparent second electrodes, then the transparent strips will compensate for the optical path difference caused by the transparent second electrodes 5.

Preferably the transparent strips 33 are made of the same material as the second electrodes, and have substantially the same thickness as the second electrodes. This is simple way of ensuring that the optical phase difference caused by the transparent strips is substantially equal to the optical phase difference caused by the transparent second electrodes.

In FIG. 23 the phase compensating members are placed on the upper surface of the first electrode 3. They are not limited to this position, however, and could be placed elsewhere provided that they are in the optical path of light that passes through gaps between adjacent first electrodes. For example, they could be placed within the insulating layer 4 on the first electrodes 3, although this would require additional fabrication steps.

Phase compensation members can be applied to any embodiment described herein above in which the second electrode(s) is/are transparent Although FIG. 23 shows an active matrix device, phase compensation members can be applied to a passive matrix device.

What is claimed is:

1. A liquid crystal device comprising:

first and second substrates;

a layer of liquid crystal disposed between the first and second substrates; and a plurality of picture elements, wherein each of the picture elements comprises:

a first electrode disposed on the first substrate;

a second electrode electrically insulated from and disposed above the first electrode relative to the substrates, the second electrode being operative to reduce in-plane electric fields within the picture element; and a third electrode disposed on the second substrate;

wherein the second electrode is of shape and location to only partially obscure a line of sight between the first and third electrodes such that an electric field within the picture element varies in intensity and is substantially normal to the first and second electrodes.

2. A liquid crystal device according to claim 1, wherein in each of the picture elements, the second electrode includes a plurality of laterally spaced second electrodes, and at least one of the second electrodes is electrically connected to the third electrode.

3. A liquid crystal device according to claim 2, wherein the plurality of second electrodes are electrically connected together.

4. A liquid crystal device according to claim 1, wherein in each of the picture elements, the second electrode includes a plurality of laterally spaced second electrodes which are electrically connected to earth potential.

5. A liquid crystal device according to claim 1, wherein the plurality of picture elements are arranged in a regular array, and in each of the picture elements, the second electrode includes a plurality of laterally spaced second electrodes, and the device further comprises addressing means for addressing the second electrodes corresponding to a row or a column of the regular array of the picture elements independently from the other rows or columns thereof.

6. A liquid crystal device according to claim 1, wherein the plurality of picture elements are arranged as a regular array.

7. A liquid crystal device according to claim 1, wherein in each of the picture elements, the second electrode comprises striped substantially parallel electrodes.

8. A liquid crystal device according to claim 7, wherein the striped substantially parallel electrodes of the second electrode are substantially evenly spaced apart.

9. A liquid crystal device according to claim 1, wherein each of the third electrodes extends along and is common to a column of the picture elements and each of the first electrodes extends along and is common to a row of the picture elements to form a passive matrix addressing arrangement.

10. A liquid crystal device according to claim 9, wherein in each of the picture elements, the second electrode comprises a plurality of laterally spaced second electrodes each extending substantially parallel to the first or third electrode.

11. A liquid crystal device according to claim 9, wherein in each of the picture elements, the second electrode comprises a plurality of laterally spaced second electrodes each extending at substantially 45 degrees to the first electrode.

12. A liquid crystal device according to claim 1, wherein the third electrode is common to all of the picture elements and each of the first electrodes comprises a picture element electrode connected to an active non-linear device to form an active matrix addressing arrangement.

13. A liquid crystal device according to claim 12, wherein the picture elements are arranged in rows and columns, and in each of the picture elements, the second electrode comprises a plurality of laterally spaced second electrodes each extending in substantially a direction of the rows or a direction of the columns.

14. A liquid crystal device according to claim 12, wherein the picture elements are arranged in rows and columns, and in each of the picture elements, the second electrode comprises a plurality of laterally spaced second electrodes each extending at substantially 45 degrees to a direction of the rows.

15. A liquid crystal device according to claim 1, wherein the second electrode extends over a central area of the corresponding picture element and a plurality of apertures are provided in the second electrode.

16. A liquid crystal device according to claim 15, wherein the second electrode is electrically connected to the third electrode.

17. A liquid crystal device according to claim 15, wherein the second electrode is electrically connected to earth potential.

18. A liquid crystal device according to claim 15, further comprising addressing means for addressing the second electrode of one of the picture elements independently from the second electrodes of the other picture elements.

19. A liquid crystal device according to claim 15, wherein the plurality of picture elements are arranged in a regular array.

20. A liquid crystal device according to claim 15, wherein the plurality of picture elements are arranged in a regular array, and the device further comprises addressing means for addressing the second electrodes corresponding to a row or a column of the regular array of the picture elements independently from the other rows or columns thereof.

21. A liquid crystal device according to claim 15, wherein the second electrode extends over substantially the entire area of the corresponding picture element.

22. A liquid crystal device according to claim 15, wherein each of the third electrodes extends along and is common to a column of the picture elements and each of the first electrodes extends along and is common to a row of the picture elements to form a passive matrix addressing arrangement.

23. A liquid crystal device according to claim 15, wherein the third electrode is common to all of the picture elements and each of the first electrodes comprises a picture element electrode connected to an active non-linear device to form an active matrix addressing arrangement.

24. A liquid crystal device according to claim 1, further comprising a first electrically insulating layer disposed on the second electrode.

25. A liquid crystal device according to claim 24, wherein the second electrode is transparent and the refractive index of the first electrically insulating layer is substantially equal to the refractive index of the second electrode.

26. A liquid crystal device according to claim 1, further comprising a first electrically insulating layer disposed between the first electrode and the second electrode.

27. A liquid crystal device according to claim 26, wherein the first electrically insulating layer has a refractive index substantially equal to the refractive index of the second electrode.

28. A liquid crystal device according to claim 1, wherein in each of the picture elements, the second electrode comprises a plurality of laterally spaced second electrodes, and the device further comprises a first electrically insulating layer disposed over the second electrodes, the refractive index of the first electrically insulating layer being substantially equal to the refractive index of the second electrodes.

29. A liquid crystal device according to claim 1, wherein the second electrode extends over a central area of the corresponding picture element and a plurality of apertures are provided in the second electrode, and the device further comprises a first electrically insulating layer disposed over the second electrode, the refractive index of the first electrically insulating layer being substantially equal to the refractive index of the second electrode.

30. A liquid crystal device according to claim 29, wherein the second electrode extends over substantially the entire area of the corresponding picture element.

31. A liquid crystal device according to claim 24, wherein the second electrode is transparent and the first electrically insulating layer is planarized.

32. A liquid crystal device according to claim 28, wherein the second electrode is transparent and the first electrically insulating layer is planarized.

33. A liquid crystal device according to claim 29, wherein the second electrode is transparent and the first electrically insulating layer is planarized.

34. A liquid crystal device according to claim 1, further comprising a waveplate disposed on the first substrate.

35. A liquid crystal device according to claim 34, wherein the waveplate comprises a first electrically insulating layer disposed between the first electrode and the second electrode.

36. A liquid crystal device according to claim 34, wherein the waveplate comprises a first electrically insulating layer disposed on the second electrode.

37. A liquid crystal device according to claim 1, further comprising a reflector disposed on the first substrate.

38. A liquid crystal device according to claim 37, wherein the reflector comprises a dielectric reflector.

39. A liquid crystal device according to claim 37, wherein the reflector comprises the first electrodes.

40. A liquid crystal device according to claim 37, wherein the reflector comprises the second electrodes.

41. A liquid crystal device according to claim 26, further comprising a reflector disposed on the first substrate, the reflector comprising the second electrodes, wherein a thickness of the first electrically insulating layer is substantially equal to $(2m+1)\lambda/2n$, where m is an integer greater than or equal to zero, $\lambda$ is a wavelength of optical radiation, and n is the refractive index of the first electrically insulating layer.

42. A liquid crystal device according to claim 24, wherein the first electrically insulating layer has a thickness $d_2$ and a refractive index $n_2$: wherein the first electrode is covered by a second electrically insulating material having a refractive index $n_1$, and an upper surface relative to the substrates at least as high as upper surfaces of the first electrically insulating layer; wherein a depth $d_1$ from the upper surface of the first electrically insulating layer to the first electrodes is such that $n_1d_1=n_2d_2$; and wherein the first and second electrodes are reflective electrodes.

43. A liquid crystal device according to claim 28, wherein the first electrically insulating layer has a thickness $d_2$ and a refractive index $n_2$; wherein the first electrode is covered by a second electrically insulating material having a refractive index $n_1$, and an upper surface relative to the substrates at least as high as upper surfaces of the first electrically insulating layer; wherein a depth $d_1$ from the upper surface of the first electrically insulating layer to the first electrodes is such that $n_1d_1=n_2d_2$; and wherein the first and second electrodes are reflective electrodes.

44. A liquid crystal device according to claim 29, wherein the first electrically insulating layer has a thickness $d_2$ and a refractive index $n_2$; wherein the first electrode is covered by a second electrically insulating material having a refractive index n1, and an upper surface relative to the substrates at least as high as upper surfaces of the first electrically insulating layer; wherein a depth $d_1$ from the upper surface of the first electrically insulating layer to the first electrodes is such that $n_1d_1=n_2d_2$; and wherein the first and second electrodes are reflective electrodes.

45. A liquid crystal device according to claim 42, wherein the second electrically insulating material is disposed over the first electrically insulating layer.

46. A liquid crystal device according to claim 43, wherein the second electrically insulating material is disposed over the first electrically insulating layer.

47. A liquid crystal device according to claim 44, wherein the second electrically insulating material is disposed over the first electrically insulating layer.

48. A liquid crystal device according to claim 39, further comprising reflecting electrodes disposed below gaps between the first electrodes relative to the first substrate, wherein the first electrodes and the reflecting electrodes are disposed in an electrically insulating material having a refractive index n, the reflecting electrodes are disposed at a depth below the first electrodes which is substantially equal to $(2m+1)\lambda/2n$, where m is an integer greater than or equal to zero and $\lambda$ is a wavelength of optical radiation.

49. A liquid crystal device according to claim 39, wherein the second electrodes disposed over gaps between the first electrodes are reflective and the second electrodes not disposed over the gaps between the first electrodes are transparent; and wherein a first electrically insulating layer disposed between the first electrodes and the second electrodes has a thickness substantially equal to (m+1)2n, where m is an integer greater than or equal to zero, $\lambda$ is a wavelength of optical radiation, and n is the refractive index of the first electrically insulating layer.

50. A liquid crystal device according to claim 41, wherein the wavelength $\lambda$ is substantially equal to 550 nanometers.

51. A liquid crystal device according to claim 48, wherein the wavelength $\lambda$ is substantially equal to 550 nanometers.

52. A liquid crystal device according to claim 49, wherein the wavelength $\lambda$ is substantially equal to 550 nanometers.

53. A liquid crystal device according to claim 1, wherein the second electrode comprises a plurality of transparent second electrodes provided in each of the picture elements; wherein the first electrodes are reflective; and wherein a plurality of phase compensating members are disposed over the first electrodes in registration with gaps between the second electrodes, an optical phase difference induced by the phase compensating members being substantially equal to an optical phase difference induced by the second electrodes.

54. A liquid crystal device according to claim 53, wherein the phase compensating members are disposed on the first electrodes.

55. A liquid crystal device according to claim 26, further comprising a reflector disposed on the first substrate, the reflector comprising the second electrodes, wherein a thickness of the first electrically insulating layer is substantially equal to $(2m+1)\lambda/2n$, where m is an integer greater than or equal to zero, $\lambda$ is a wavelength of optical radiation, and n is the refractive index of the first electrically insulating layer, and wherein the first and second electrodes are reflective electrodes.

56. A liquid crystal device according to claim 1, wherein in each of the picture elements, the first electrode is generally continuous across an aperture of the picture element.

57. A liquid crystal device according to claim 56, wherein in each of the picture elements, the second electrode comprises a plurality of gaps or apertures distributed generally uniformly across the aperture of the picture element.

58. A liquid crystal device according to claim 1, wherein in each of the picture elements, the second electrode is configured in relation to the first electrode to result in a plurality of generally discrete electric field groups each extending generally vertically between the first and second substrates.

59. A liquid crystal device according to claim 58, wherein in each of the picture elements, the second electrode is configured in relation to the first electrode so as to minimize in-plane electric fields between the electric field groups.

60. A liquid crystal device according to claim 1, wherein each of the picture elements is switchable between a phase-only diffractive mode and a non-diffractive mode.

61. A liquid crystal device comprising:
first and second substrates;
a layer of liquid crystal disposed between the first and second substrates; and
a plurality of picture elements,
wherein each of the picture elements comprises:
a first electrode disposed on the first substrate;
a second electrode electrically insulated from and disposed above the first electrode relative to the substrates; and
a third electrode disposed on the second substrate
wherein the second electrode is of shape and location to only partially obscure a line of sight between the first and third electrodes such that an electric field within the picture element varies in intensity and is substantially normal to the first and second electrodes.

62. A liquid crystal device according to claim 61, wherein in each of the picture elements, the first electrode is generally continuous across an aperture of the picture element.

63. A liquid crystal device according to claim 62, wherein in each of the picture elements, the second electrode comprises a plurality of gaps or apertures distributed generally uniformly across the aperture of the picture element.

64. A liquid crystal device according to claim 61, wherein in each of the picture elements, the second electrode is configured in relation to the first electrode to result in a plurality of generally discrete electric field groups each extending generally vertically between the first and second substrates.

65. A liquid crystal device according to claim 64, wherein in each of the picture elements, the second electrode is configured in relation to the first electrode so as to minimize in-plane electric fields between the electric field groups.

66. A liquid crystal device according to claim 61, wherein each of the picture elements is switchable between a phase-only diffractive mode and a non-diffractive mode.

* * * * *